United States Patent
Lee et al.

(10) Patent No.: US 9,357,505 B2
(45) Date of Patent: May 31, 2016

(54) PROCESSING DIGITAL SIGNAL

(71) Applicant: KT CORPORATION, Gyeonggi-do (KR)

(72) Inventors: Ki-Ho Lee, Gyeonggi-do (KR); Yong-Gyoo Lee, Seoul (KR); Yung-Ha Ji, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 648 days.

(21) Appl. No.: 13/726,000

(22) Filed: Dec. 21, 2012

(65) Prior Publication Data

US 2013/0163416 A1    Jun. 27, 2013

(30) Foreign Application Priority Data

Dec. 26, 2011 (KR) .......................... 10-2011-0142728

(51) Int. Cl.
| | |
|---|---|
| H04W 52/24 | (2009.01) |
| H04W 52/02 | (2009.01) |
| H04W 24/08 | (2009.01) |
| H04W 76/04 | (2009.01) |
| H04W 88/08 | (2009.01) |
| H04W 88/02 | (2009.01) |
| H04B 7/02 | (2006.01) |

(52) U.S. Cl.
CPC .............. *H04W 52/245* (2013.01); *H04B 7/022* (2013.01); *H04W 24/08* (2013.01); *H04W 52/0245* (2013.01); *H04W 76/04* (2013.01); *H04W 88/02* (2013.01); *H04W 88/085* (2013.01)

(58) Field of Classification Search
None
See application file for complete search history.

(56) References Cited

U.S. PATENT DOCUMENTS

| | | |
|---|---|---|
| 2003/0199275 A1 | 10/2003 | Sakoda et al. |
| 2004/0106412 A1 | 6/2004 | Laroia et al. |
| 2006/0233138 A1 | 10/2006 | Park |
| 2007/0147287 A1 | 6/2007 | Jalil et al. |
| 2008/0032726 A1 | 2/2008 | Tajima et al. |
| 2009/0181673 A1 | 7/2009 | Barrett |
| 2010/0041409 A1 | 2/2010 | Kim et al. |

(Continued)

FOREIGN PATENT DOCUMENTS

| | | |
|---|---|---|
| JP | 2011-139442 A | 7/2011 |
| KR | 10-2006-0110384 A | 10/2006 |

(Continued)

OTHER PUBLICATIONS

Ralf Irmer et al., "Coordinated multipoint: Concepts, Performance, and Field Trial Results", IEEE Communications Magazine, Feb. 2011, pp. 102-111, vol. 49, Issue 2.

(Continued)

*Primary Examiner* — Ashley Shivers
(74) *Attorney, Agent, or Firm* — IP Legal Services, LLC

(57) ABSTRACT

Described embodiments provide a digital unit for controlling a plurality of radio units to transmit a signal to user equipment. The digital unit may determine whether user equipment is located at an overlapping service area of a first radio unit and a second radio unit and control the first radio unit to transmit a signal to the user equipment using the first antenna and control the second radio unit to transmit the same signal to the user equipment using the second antenna when the user equipment is located in the overlapping service area. A transmission pattern of the first antenna of the first radio unit may be different from a transmission pattern of the second antenna of the second radio unit.

17 Claims, 9 Drawing Sheets

(56) References Cited

U.S. PATENT DOCUMENTS

| | | |
|---|---|---|
| 2010/0184449 A1 | 7/2010 | Kim et al. |
| 2010/0238821 A1 | 9/2010 | Liu et al. |
| 2010/0273514 A1 | 10/2010 | Koo et al. |
| 2010/0322171 A1* | 12/2010 | Dekorsy et al. ............... 370/329 |
| 2011/0010768 A1 | 1/2011 | Barriga et al. |
| 2011/0034175 A1 | 2/2011 | Fong et al. |
| 2011/0080896 A1 | 4/2011 | Krishnamurthy et al. |
| 2011/0170422 A1 | 7/2011 | Hu et al. |
| 2011/0176634 A1 | 7/2011 | Yoon et al. |
| 2011/0183673 A1 | 7/2011 | Kishiyama et al. |
| 2011/0189997 A1* | 8/2011 | Tiwari .................. H04W 36/26 455/443 |
| 2011/0195662 A1 | 8/2011 | Seo et al. |
| 2011/0211487 A1 | 9/2011 | Han et al. |
| 2011/0223962 A1 | 9/2011 | Kuwahara et al. |
| 2011/0235608 A1 | 9/2011 | Koo et al. |
| 2011/0237272 A1 | 9/2011 | Gorokhov et al. |
| 2011/0243085 A1 | 10/2011 | Seo et al. |
| 2011/0255514 A1 | 10/2011 | Olofsson et al. |
| 2011/0261774 A1 | 10/2011 | Lunttila et al. |
| 2011/0281585 A1 | 11/2011 | Kwon et al. |
| 2012/0021738 A1 | 1/2012 | Koo et al. |
| 2012/0028665 A1 | 2/2012 | Kwon et al. |
| 2012/0087273 A1 | 4/2012 | Koo et al. |
| 2012/0127934 A1 | 5/2012 | Anderson et al. |
| 2012/0147805 A1 | 6/2012 | Kim et al. |
| 2012/0155307 A1 | 6/2012 | Turk et al. |
| 2012/0281555 A1 | 11/2012 | Gao et al. |
| 2012/0322497 A1 | 12/2012 | Navda et al. |
| 2013/0040683 A1* | 2/2013 | Siomina et al. ............... 455/517 |
| 2013/0196678 A1* | 8/2013 | Liu et al. .................. 455/452.1 |
| 2014/0220997 A1 | 8/2014 | Ezaki |
| 2014/0254537 A1 | 9/2014 | Kim et al. |
| 2014/0307687 A1 | 10/2014 | Fujishiro et al. |
| 2014/0357320 A1 | 12/2014 | Lee et al. |
| 2015/0003426 A1 | 1/2015 | Lee et al. |

FOREIGN PATENT DOCUMENTS

| | | |
|---|---|---|
| KR | 10-2007-0085800 A | 8/2007 |
| KR | 10-2009-0073592 A | 7/2009 |
| KR | 10-2009-0101760 A | 9/2009 |
| KR | 10-2010-0082287 A | 7/2010 |
| KR | 10-2010-0084771 A | 7/2010 |
| KR | 10-2010-0100571 A | 9/2010 |
| KR | 10-2010-0110526 A | 10/2010 |
| KR | 10-2010-0131341 A | 12/2010 |
| KR | 10-2011-0084594 A | 7/2011 |
| KR | 10-1169541 B1 | 7/2012 |
| KR | 10-1206116 B1 | 11/2012 |
| WO | 2010/087619 A2 | 8/2010 |
| WO | 2010/107255 A2 | 9/2010 |
| WO | 2011/017515 A2 | 2/2011 |
| WO | 2011/022733 A2 | 2/2011 |

OTHER PUBLICATIONS

Sharp, "Considerations on precoding scheme for DL joint processing CoMP", R1-090696, 3GPP TSG RAN WG1 Meeting #56, Athens, Greece, Feb. 9-13, 2009, pp. 1-8.

Samsung, "Design Considerations for CoMP Joint Transmission", R1-093382, 3GPP TSG RAN WG1 Meeting #58, Shenzhen, China, Aug. 24-28, 2009, pp. 1-10.

* cited by examiner (A)

(B)

under 35 U.S.C.
PROCESSING DIGITAL SIGNAL

CROSS REFERENCE TO PRIOR APPLICATIONS

The present application claims priority under 35 U.S.C. §119 to Korean Patent Application No. 10-2011-0142728 (filed on Dec. 26, 2011), which is hereby incorporated by reference in its entirety.

The subject meter of this application is related to U.S. patent application Ser. No. 13/726,006 filed Dec. 22, 2012, the teachings of which are incorporated herein in their entirety by reference.

FIELD OF THE INVENTION

The present invention relates to communications and, in particular, to controlling radio units to transmit a signal to user equipment in an overlapping service area of the radio units.

BACKGROUND OF THE INVENTION

A typical base station includes a digital unit, a radio unit, and an antenna in one physical system. Such a structure of a base station has limitations to be optimized in a cell design. In order to optimize and improve the cell design, a digital unit and a radio unit are spatially separated and the radio unit is installed at a remote location. For example, a digital unit may be installed in a base station. Multiple radio units may be installed at remote locations with antennas and coupled to the digital unit through an optical fiber. Such structure may reduce dead-spaces or holes in coverage but cannot maximize overall radio network capacity.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a radio unit having at least two antennas may be controlled to transmit a signal to user equipment using one antenna when the user equipment is located in an overlapping service area of the radio unit and a neighbor radio unit.

In accordance with another aspect of the present invention, radio units in adjacent cells may transmit the same data signal to one user equipment located in an overlapping area each using one antenna and using the same channel when user equipment located in an overlapping service area of two adjacent cells and/or when one of the radio units has comparatively high traffic load.

In accordance with at least one embodiment of the present invention, a method may be provided for controlling radio units to transmit a signal to user equipment wherein each one of the radio units includes at least two antennas including a first antenna and a second antenna, each associated with a different transmission pattern. The method may include determining whether user equipment is located at an overlapping service area of a first radio unit and a second radio unit and controlling the first radio unit to transmit a signal to the user equipment using the first antenna and controlling the second radio unit to transmit the same signal to the user equipment using the second antenna when the user equipment is located in the overlapping service area. A transmission pattern of the first antenna of the first radio unit may be different from a transmission pattern of the second antenna of the second radio unit.

The determining may include receiving a signal strength value $S_a$ of an uplink signal between the user equipment and the first radio unit, receiving a signal strength value $S_b$ of an uplink signal between the user equipment and the second radio unit, comparing a difference of the signal strength values $S_a$ and $S_b$ with a predetermined threshold $S_{th}$, and determining whether the user equipment is located in the overlapping service area of the first radio unit and the second radio unit based on the comparison result.

The determining may include determining that the user equipment is located in the overlapping service area when the difference is smaller than the predetermined threshold $S_{th}$ and determining that the user equipment is not located in the overlapping service area when the difference is greater than the predetermined threshold $S_{th}$.

The controlling may include selecting one of the first and second radio units based on the signal strength values $S_a$ and $S_b$ when the user equipment is determined as being not located in the overlapping service area and controlling the selected one to transmit the signal to the user equipment using both of the first and second antennas.

The method may further include determining whether traffic load of at least one of the first and second radio units is greater than a predetermined reference traffic load, and controlling the first radio unit to transmit a signal to the user equipment using the first antenna and controlling the second radio unit to transmit the same signal to the user equipment using the second antenna when the user equipment is located in the overlapping service area and when the traffic load of at least one of the first and second radio units is greater than the predetermined reference traffic load.

The method may further include controlling the first radio unit and the second radio unit to transmit the same signal to the user equipment each using both of the first and second antennas when the first and second radio units are determined as having comparatively low traffic load.

The transmission pattern associated with each antenna may be a reference signal pattern to transmit a reference signal to the user equipment.

In the controlling, the first and second radio units may transmit the same signal to the user equipment using a same channel when the user equipment is located in the overlapping service area.

The first and second radio units may be spatially separated from a digital unit, coupled to a digital unit through a communication link and transmit the signals to the user equipment in response to instructions of the digital unit.

The first and second radio units may transmit signals using resources based on one of orthogonal frequency division multiplexing (OFDM) and wideband code division multiple access (WCDMA).

The first radio unit may be included in a cell and the second radio unit is included in another cell adjacent to the cell of the first radio unit.

In accordance with at least one embodiment of the present invention, a digital unit may be provided for controlling a plurality of radio units to transmit a signal to user equipment, where each of the plurality of radio units includes at least two antennas including a first antenna and a second antenna each associated with a different transmission pattern. The digital unit may include a receiving unit, a determination unit, and a controlling unit. The receiving unit may be configured to receive a signal strength value $S_a$ of uplink signals between user equipment and a first radio unit, to receive a signal strength value $S_b$ of uplink signals between the user equipment and a second radio unit, and to receive information on traffic load of the first radio unit and the second radio unit. The determination unit may be configured to determine whether the user equipment is located at an overlapping service area of the first radio unit and the second radio unit based on the received signal strength values $S_a$ and $S_b$ of uplink signals and to determine whether at least one of the first and second radio units has comparatively high traffic load based on the received information on the traffic load. The controlling unit may be configured to control the first radio unit to transmit a signal to the user equipment using the first antenna and to control the second radio unit to transmit the same signal to the user equipment using the second antenna when the user equipment is determined as being located in the overlapping service area and/or when at least one of the first and second radio units is determined as having comparatively high traffic load. A transmission pattern of the first antenna of the first radio unit may be different from a transmission pattern of the second antenna of the second radio unit.

The determination unit may be configured to compare a difference of the signal strength values $S_a$ and $S_b$ with a predetermined threshold $S_{th}$, to determine that the user equipment is located in the overlapping service area when the difference is smaller than the predetermined threshold $S_{th}$, and to determine that the user equipment is not located in the overlapping service area when the difference is greater than the predetermined threshold $S_{th}$.

The controlling unit may be configured to select one of the first and second radio units based on the signal strength values $S_a$ and $S_b$ when the user equipment is determined as being not located in the overlapping service area and to control the selected one to transmit the signal to the user equipment using both of the first and second antennas.

The controlling unit may be configured to control the first radio unit and the second radio unit to transmit the same signal to the user equipment each using both of the first and second antennas when the user equipment is determined as being located in the overlapping service area and when the first and second radio units are determined as having comparatively low traffic load.

The controlling unit may be configured to control the first radio unit and the second radio unit to transmit the same signal to user equipment using the same channel when the user equipment is located in the overlapping service area and/or when at least one of the first and second radio units has comparatively high traffic load.

The digital unit may be configured to be spatially separated from the first and second radio units and coupled to the first and second radio units through a communication link. The first radio unit may be included in a cell and the second radio unit may be included in another cell adjacent to the cell of the first radio unit. The transmission pattern may be a reference signal pattern for transmitting a reference signal based on one of orthogonal frequency division multiplexing (OFDM) and wideband code division multiple access (WCDMA).

In accordance with at least one embodiment of the present invention, a radio unit may be spatially separated from a digital unit and transmit and receiving a signal to/from user equipment in response to the digital unit. Such a radio unit may be configured to include a first antenna and a second antenna each associated with a different transmission pattern. In response to an instruction of the digital unit, the radio unit may be configured to select one of the first antenna and the second antenna and to transmit a signal to user equipment using the selected one antenna when the user equipment is located at an overlapping service area of the radio unit and a neighbor radio unit and when the radio unit has a comparatively high traffic load. When the radio unit transmits the signal to the user equipment using the selected one antenna, the neighbor radio unit may transmit the same signal to the user equipment using one antenna associated with a transmission pattern different from the selected one antenna of the radio unit.

The radio unit may be configured to transmit a signal to the user equipment using both of the first antenna and the second antenna when the user equipment is in the overlapping service area and when the traffic load of the radio unit is comparatively low.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
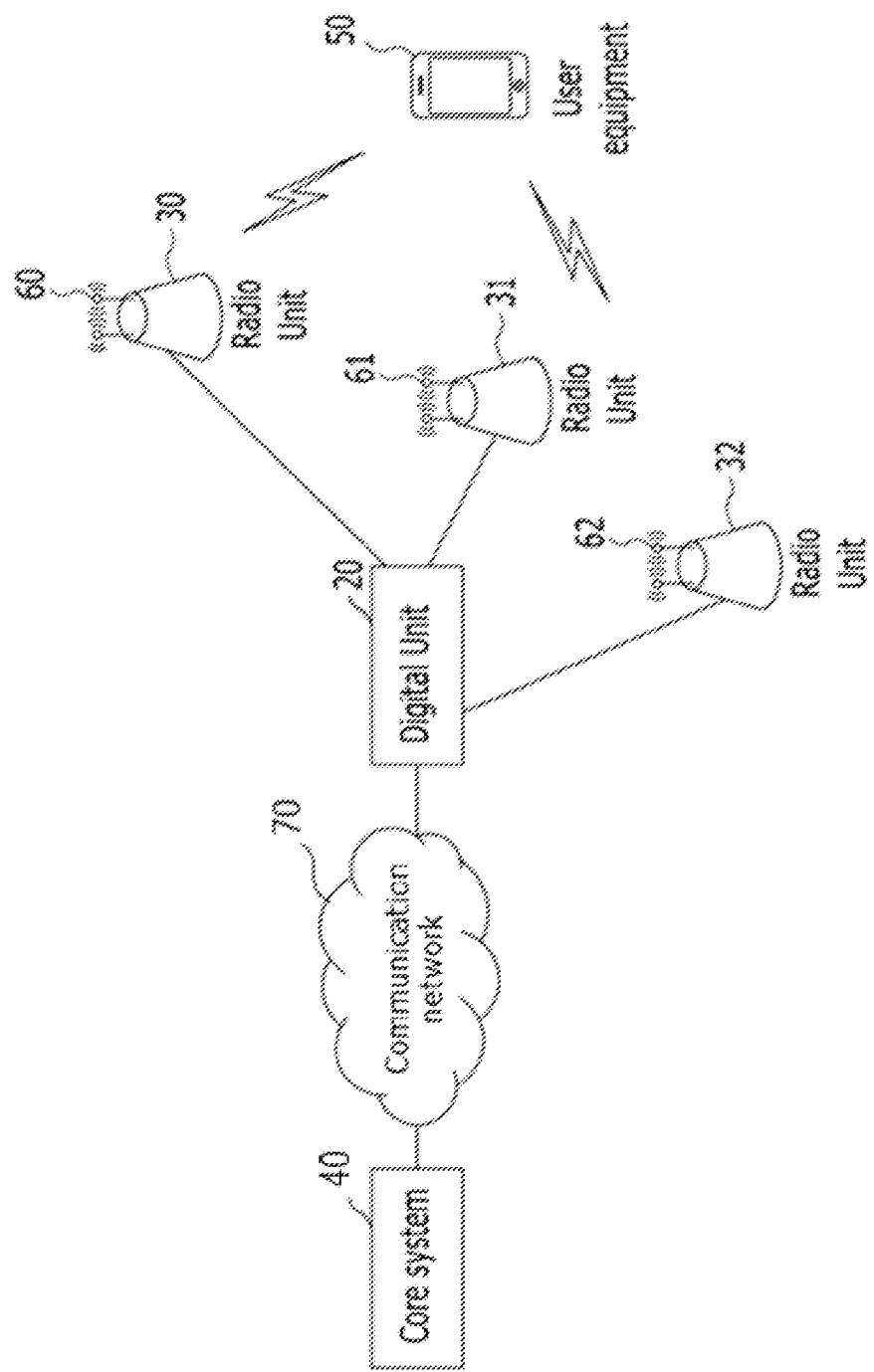
FIG. 1 shows a system in accordance with at least one embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

The term "user equipment" as used herein may refer to any of a terminal, a mobile station (MS), a mobile terminal (MT), a subscriber station (SS), a portable subscriber station (PSS), and an access terminal (AT), and may include some or all of the functions thereof.

The term "base station (BS)" as used herein may refer to any of an access point (AP), a radio access station (RAS), a node B, an evolved node B (eNodeB), a base transceiver station (BTS), and a mobile multihop relay (MMR)-BS, and may include some or all of the functions thereof.

FIG. 1 shows a network in accordance with at least one embodiment of the present invention.

Referring to FIG. 1, network 10 may include digital unit 20, plurality of radio units 30, 31, and 32, and core system 40 in accordance with at least one embodiment of the present invention. Network 10 may be a long term evolution (LTE) network, but the present invention is not limited thereto. Digital unit 20 may be spatially separated from plurality of radio units 30, 31, and 32 and installed at different locations in accordance with at least one embodiment of the present invention. For example, digital unit 20 may be installed in a base station (not shown) or in a digital unit center (not shown) of a central office with a switching system. Digital unit 20 may be coupled to core system 40 through communication network 70. Such digital unit 20 may be coupled to a plurality of radio units 30, 31, and 32 through an optical interface, but the present invention is not limited thereto. Digital unit 20 may be referred to as a baseband unit.

Digital unit 20 may transmit and receive signals to/from radio units 30, 31, and 32. Digital unit 20 may be constituent elements for process signals digitally. For example, digital unit 20 may encrypt and decrypt the signals. The signals may be a radio digital signal generated based on with $3^{rd}$ generation partnership project (3GPP), worldwide interoperability for microwave access (WiMAX), Wireless Broadband (WiBro), and/or long term evolution (LTE), but the present invention is not limited thereto. Digital unit 20 may be connected to core system 40 through communication network 70.

As described, digital unit 20 may be spatially separated from radio units 30, 31, and 32 and installed at different locations such as a corresponding base station and a digital unit center (not shown). Digital unit 20 may be installed at a corresponding base station (not shown) and the base station may be connected to core system 40 through communication network 70. The present invention, however, is not limited thereto. Digital unit 20 may be installed at a digital unit center (not shown). The digital unit center may include a plurality of digital units in a cloud computing center system. The digital units may be centralized in the digital unit center installed at a central office with a switching system in a cloud computing center system. Accordingly, digital unit 20 may be a virtualized base station. Digital unit 20 may be coupled to corresponding radio units 30, 31, and 32 through an optical interface, but the present invention is not limited thereto. Digital unit 20 may be coupled to a plurality of radio units 30, 31, and 32 and manage and control coupled radio units 30, 31, and 32, but the present invention is not limited thereto. Digital unit 20 may be coupled to one radio unit.

Radio units 30, 31, and 32 may be distributed and installed at various locations with corresponding antennas 60, 61, and 62. For example, radio units 30, 31, and 32 are installed with at least one antenna at each floor of an office building in accordance with embodiments of the present invention. Such a structure may enable to form various types of cells and reduce coverage holes. Radio units 30, 31, and 32 may be controlled and managed by coupled digital unit 20. For example, each one of radio units 30, 31, and 32 may receive signals from digital unit 20, process the received signals, and transmit the processed signal to user equipment 50. Furthermore, radio units 30, 31, and 32 may receive signals from user equipment 50, process the received signals, and transmit the processed signals to digital unit 20. In general, radio units 30, 31, and 32 may be a set of elements for processing a radio frequency signal. For example, radio units 30, 31, and 32 may convert digital signals from digital unit 20 to a radio frequency signal according to a frequency band, amplify the radio frequency signal, and transmit the radio frequency signal through antennas (not shown). Accordingly, radio units 30, 31, and 32 may include a converter and an amplifier.

In accordance with at least one embodiment of the present invention, digital unit 20 may control signal transmission in radio units 30, 31, and 32. For example, digital unit 20 may use multiple radio units to simultaneously transmit a data signal to user equipment through a same channel when the user equipment is located in overlapping service areas of the multiple radio units. In this case, digital unit 20 may allocate the same radio resource to related radio units to transmit a data signal to user equipment. For example, the multiple radio units may transmit the same data signal to the user equipment through the same channel in response to the control of digital unit 20.

Core system 40 may be coupled to digital unit 20 through communication network 70. Core system 40 may manage connection between digital unit 20 and an external network. Core system 40 may include a switching center (not shown). Such network 10 may form various cell structures because radio units 30, 31, and 32 with antennas 60, 61, and 62 are spatially separated from digital unit 20 and installed at different locations. Hereinafter, such cell structure in accordance with embodiments of the present invention will be described with reference to FIG. 2.

Figure 2:
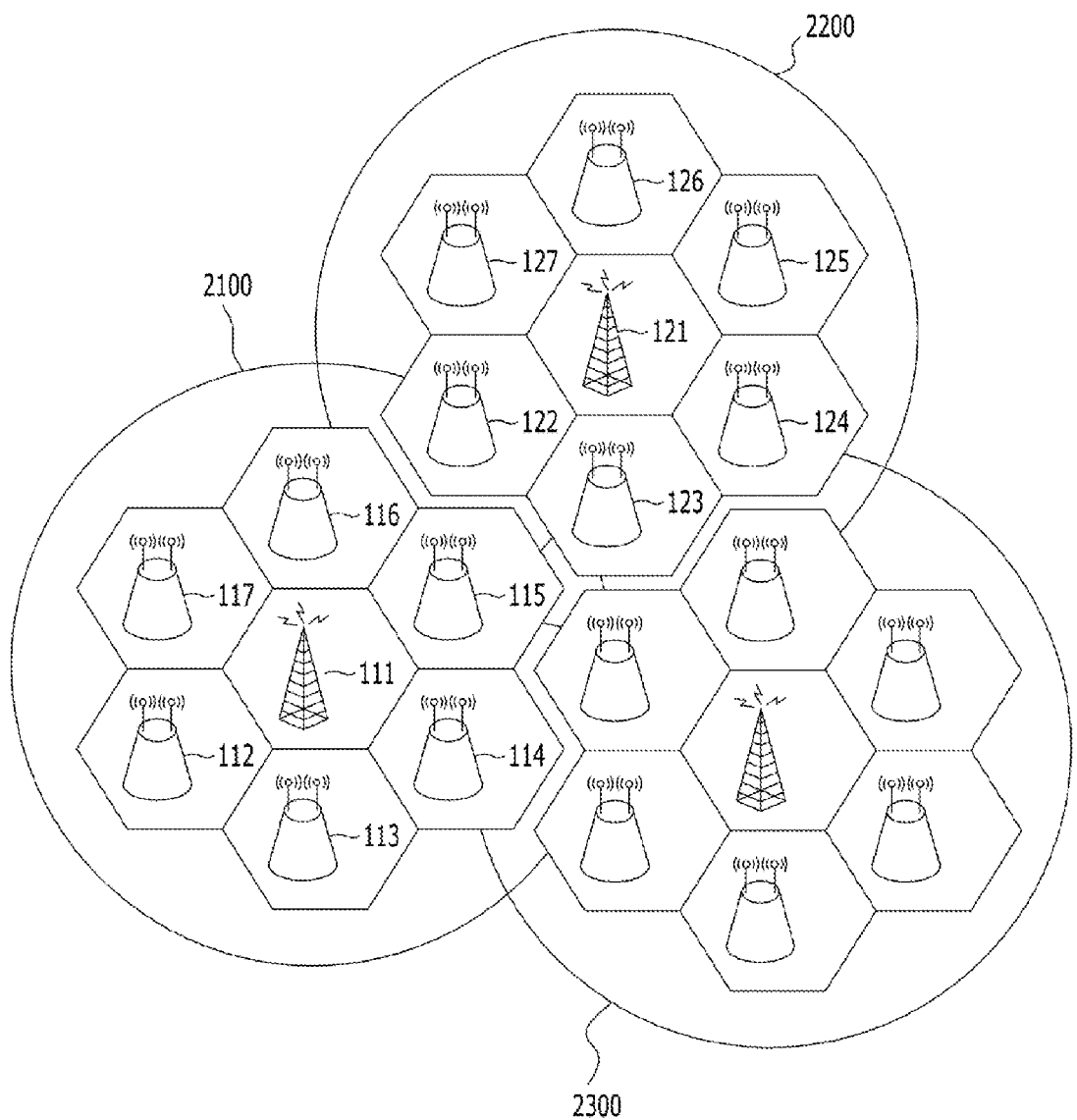
FIG. 2 shows a cell structure in accordance with at least one embodiment of the present invention.

FIG. 2 shows a cell structure in accordance with at least one embodiment of the present invention.

Referring to FIG. 2, network 10 may include a plurality of cells 2100, 2200, and 2300. Each one of cells 2100, 2200, and 2300 may include one macro radio unit and a plurality of cooperative radio units. For example, cell 2100 may include macro radio unit 111 and a plurality of cooperative radio units 112, 113, 114, 115, 116, and 117. Furthermore, cell 2200 may include macro radio unit 121 and a plurality of cooperative radio units 122, 123, 124, 125, 126, and 127. The cell structure of cell 2100 will be representatively described, hereinafter. Cell 2200 and cell 2300 may have the similar cell structure of cell 2100.

As described, cell 2100 may include macro radio unit 111 and a plurality of cooperative radio units 112, 113, 114, 115, 116, and 117. Macro radio unit 111 may manage overall communication processes in cell 2100. Macro radio unit 111 may be operated as a repeater mode and a typical sector mode. Macro radio unit 111 may always duplicate a signal and transmit the duplicated signals in the repeater mode. Macro radio unit 111 may transmit a signal to all user equipment located within cell 2100 with high transmission power.

Cooperative radio units 112 to 117 may transmit and receive signals to/from one or more user equipment located within a comparatively short distance therefrom. Cooperative radio units 112 to 117 may transmit signals with transmission power smaller than that of macro radio unit 111. Cooperative radio units 112 to 117 may transmit signals when required.

Such macro radio unit 111 and plurality of cooperative radio units 112 to 117 may be controlled by coupled digital unit 20. In accordance with at least one embodiment of the present invention, digital unit 20 may control and manage macro radio unit 111 and cooperative radio units 112 to 117 in the same cell in order to efficiently use radio resources and to maximize radio capacity.

As shown, one cell may include at least one macro radio unit and a plurality of cooperative radio units. All radio units included in each cell may be controlled by coupled digital unit 20. Such radio units 111 to 117 may transmit a various types of radio signals. The radio signals may include a control signal, a data signal, and a reference signal. The control signal may use to inform system information and data channel allocation information. The data signal may be used to transmit user data. The reference signal may be used for frequency scheduling and channel estimation. The reference signal may be a pilot signal. Such reference signal may be used to recover data signal.

In the same cell, a plurality of cooperative radio units and a macro radio unit may transmit the same control signal and the same reference signals. For example, in cell 2200, cooperative radio units 122 to 126 may transmit control signals and reference signals, which are identical to those transmitted from macro radio unit 121. Radio units in one cell may transmit a control signal and a reference signal, different from those transmitted from radio units in the other cells. For example, radio units 121 to 127 in cell 2200 may transmit control signals and reference signals, which are different from those transmitted from radio units 111 to 117 in cell 2100. As described, the cell may include a plurality of cooperative radio units as well as a macro radio unit. Accordingly, user equipment may effectively receive a control signal and a reference signal, which are commonly transmitted from a plurality of radio units in the same cell.

As shown in FIG. 1 and FIG. 2, multiple radio units are spatially separated from a corresponding digital unit. Such cell design may reduce dead spaces and/or holes in coverage for providing related communication services to user equipment but may not maximize system capacity. In order to maximize system capacity such as system data rates, multiple input and multiple output (MIMO) might be employed based on orthogonal frequency division multiplexing (OFDM). In accordance with at least one embodiment of the present invention, a radio unit may include multiple antennas for supporting MIMO in order to maximize system capacity. Particularly, a radio unit may include two antennas for supporting 2×2 MIMO in accordance with at least one embodiment of the present invention. For the 2×2 MIMO, a radio unit may use a different reference signal pattern for each antenna. In a long term evolution (LTE) network, resources such as OFDM symbols are allocated with different patterns for transmitting a reference signal through each antenna.

Figure 3:
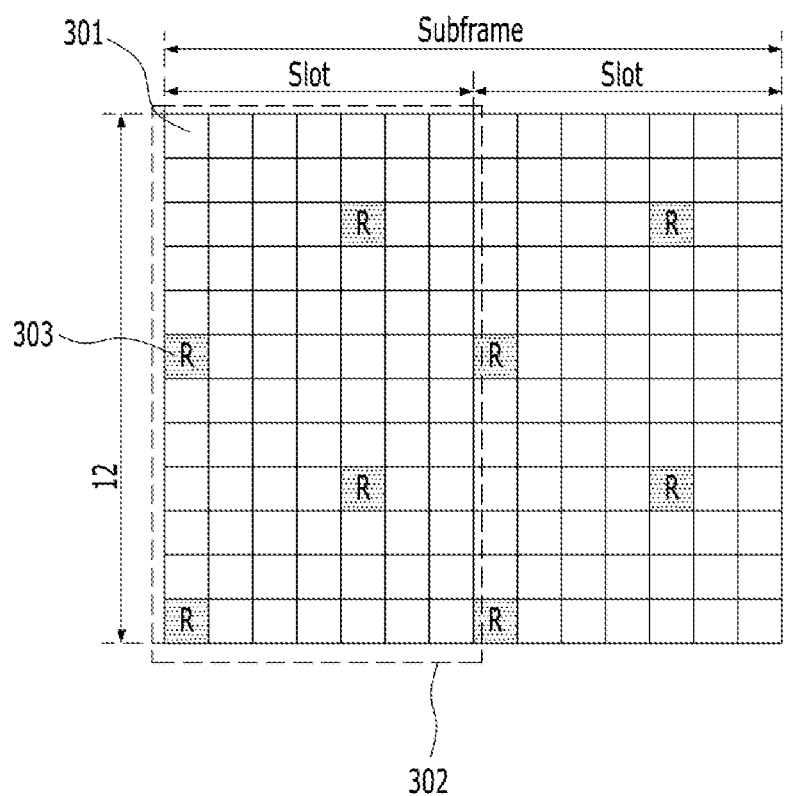
FIG. 3 shows OFDM symbols in a resource grid form.

FIG. 3 shows OFDM symbols in a resource grid form.

As shown in FIG. 3, OFDM symbols may be represented by a resource grid in a time and frequency dimension. Each box 301 in the resource grid denotes a single subcarrier for one symbol period. Such box 301 may be referred to as a resource element. The resource element may be the smallest element of resource allocation. A resource block 302 may be a minimum resource unit for transmitting data. For example, when a bandwidth is about 10 MHz, one resource block may include about 50 resource elements. Each resource block may be about 0.5 ms. Two resource blocks are allocated as one subframe (about 1 ms), each resource block corresponding to a slot. The first three symbols may be transmitted as a control channel for informing resource allocation information. In such configuration, reference symbols 303 are used to transmit a reference signal. Since a radio unit includes two antennas for supporting 2×2 MIMO, two different reference symbols are used for the two antennas. Such reference symbols are shown in FIG. 4.

Figure 4:
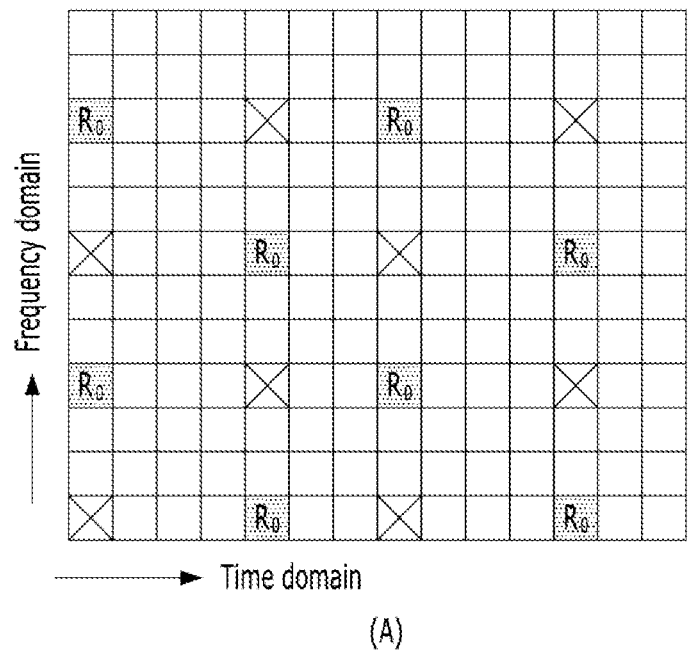
FIG. 4 shows resource elements allocated for a first antenna in order to transmit a reference signal and for a second antenna in order to transmit a reference signal when a radio unit includes two antennas for supporting 2×2 MIMO.
Figure 4:
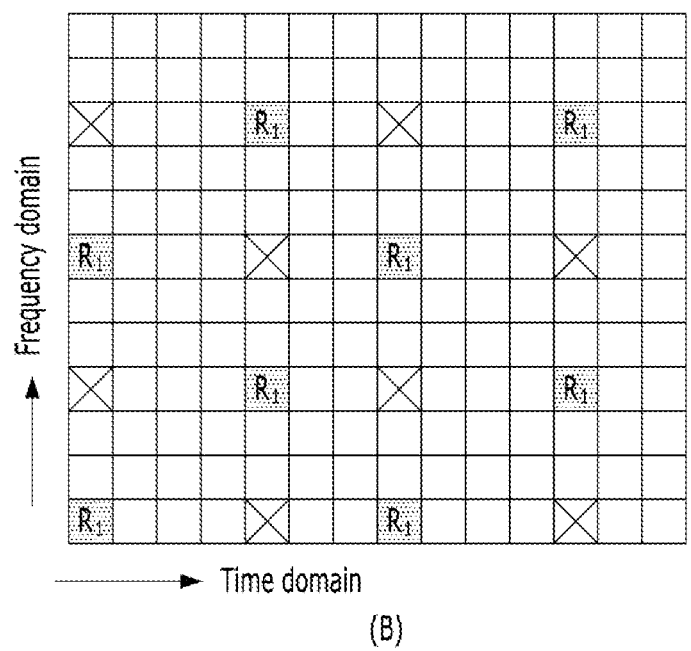

FIG. 4 shows resource elements allocated for a first antenna in order to transmit a reference signal and for a second antenna in order to transmit a reference signal when a radio unit includes two antennas for supporting 2×2 MIMO.

Referring to FIG. 4, resource elements for a reference signal are allocated with a different pattern for the first and second antennas of the radio unit for supporting 2×2 MIMO. As shown in a diagram (A) of FIG. 4, resource elements $R_0$ are used for transmitting a reference signal through the first antenna. As shown in a diagram (B) of FIG. 4, resource elements $R_1$ are used for transmitting a reference signal through the second antenna. Radio units may transmit reference signals with different patterns through each one of antennas as shown in FIG. 4.

As described above, a different reference signal pattern is used for each antenna of a radio unit for supporting 2×2 MIMO in accordance with at least one embodiment of the present invention. Using two antennas, a radio unit may transmit the same data to related user equipment. For example, radio units 111 to 117 in cell 2100 may use the same reference signal patterns and the same symbols for transmitting data to user equipment. Accordingly, a diversity gain may be improved when the same data are transmitted through the same channel in a corresponding cell. Such operation will be described with reference to FIG. 5.

Figure 5:
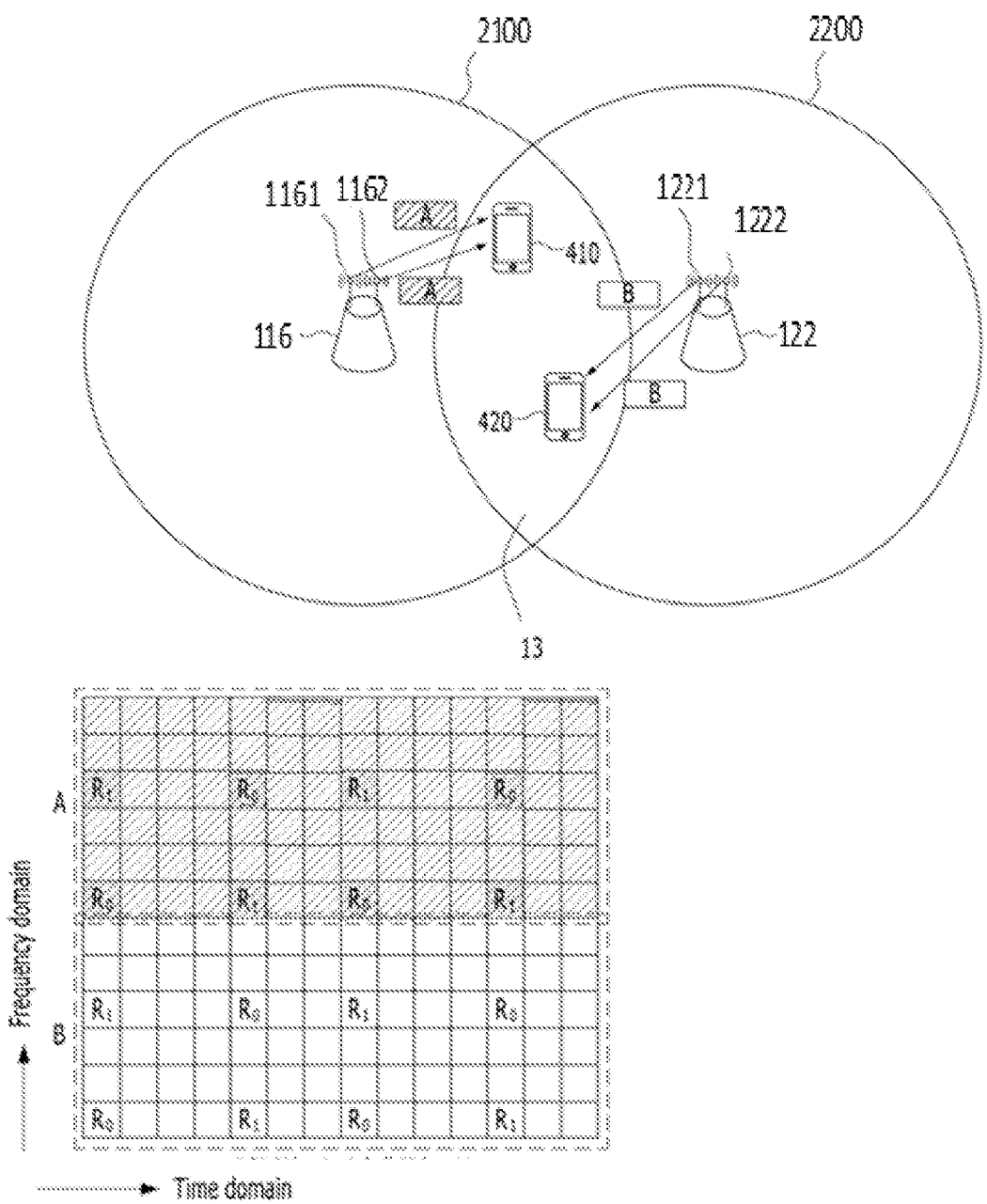
FIG. 5 shows a typical method of a radio unit having two antennas for transmitting signals to user equipment in an overlapping area of two adjacent cells.

FIG. 5 shows a typical method of a radio unit having two antennas for transmitting signals to user equipment in an overlapping area of two adjacent cells.

Referring to FIG. 5, cells 2100 and 2200 are adjacent to each other and include overlapping service area 13. Cell 2100 may include radio unit 116 and cell 2200 may include radio unit 122. Overlapping service area 13 may be referred to as a boundary area of cell 2100 and cell 2200. In such overlapping area 13, user equipment 410 and 420 may be located. In this case, radio unit 116 may provide a related service to user equipment 410 and radio unit 122 may provide a related service to user equipment 420.

For supporting 2×2 MIMO, each one of radio units 116 and 122 may include two antennas. For example, radio unit 116 may include first antenna 1161 and second antenna 1162. Radio unit 122 may include first antenna 1221 and second antenna 1222. Radio unit 116 may transmit the same signal to user equipment 410 through two antennas 1161 and 1162 each using a different reference signal pattern. That is, radio unit 116 may transmit the same signal with different reference signals to user equipment 410 through two antennas 1161 and 1162. Similarly, radio unit 122 may transmit the same signal to user equipment 410 using two antennas 1221 and 1222 each using a different reference signal pattern. That is, radio unit 122 may transmit the same signal to user equipment 420 with the different reference signal through two antennas 1221 and 1222 in accordance with at least one embodiment of the present invention.

In order to prevent interference of signals transmitted to user equipment 410 and 420 in overlapping service area 13, radio units 116 and 122 may use different channel resources to transmit signals. For example, different resource blocks may be used for transmitting signals. That is, radio unit 116 may use resource block A to transmit signals to user equipment 410 through first and second antennas 1161 and 1162. Radio unit 122 may use resource block B to transmit signals to user equipment 420 through first and second antennas 1221 and 1222 in accordance with at least one embodiment of the present invention.

As described in the typical method, radio unit 116 in cell 2100 transmits data to user equipment 410 using two antennas 1161 and 1162 and radio unit 122 in cell 2200 transmits data to user equipment 420 using two antennas 1221 and 1222 when user equipment 410 and 420 are located in overlapping service area 13 of radio units 116 and 122. Such typical method may be not efficient when radio units 116 and 122 provide a related service to user equipment located in overlapping area 13 and/or when one of radio units 116 and 122 is in an error state or has heavy traffic load.

In accordance with at least one embodiment of the present invention, when user equipment located in an overlapping service area of two adjacent cells and/or when one of the radio units has comparatively high traffic load, radio units in adjacent cells may transmit the same data signal to one user equipment located in the overlapping area each using one antenna and using the same channel. Such way may maximize diversity effect. Such operation will be described with reference to FIG. 6.

Figure 6:
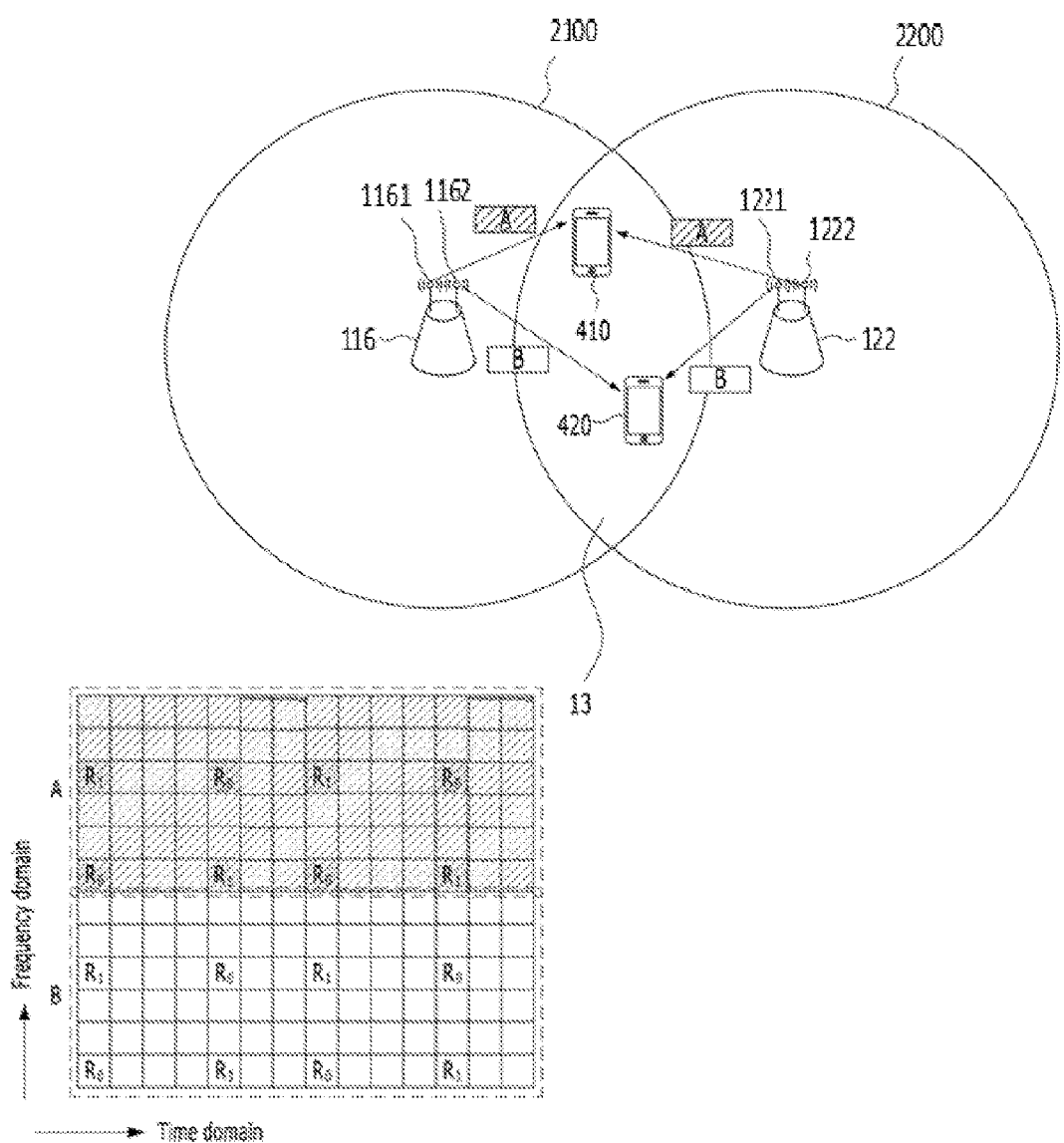
FIG. 6 shows a method of a radio unit having two antennas for transmitting signals to user equipment in an overlapping service area in accordance with at least one embodiment of the present invention.

FIG. 6 shows a method of a radio unit having two antennas for transmitting signals to user equipment in overlapping service area in accordance with at least one embodiment of the present invention.

Referring to FIG. 6, radio unit 116 may include two antennas 1161 and 1162 and radio unit 122 may include two antennas 1221 and 1222. Radio units 116 and 122 may transmit the same data to user equipment through two antennas 1161 and 1162 or 1221 and 1222 each using a different transmission pattern. For example, first antenna 1161 of radio unit 116 in cell 2100 may transmit a signal with a first transmission pattern and second antenna 1162 of radio unit 116 may transmit a signal with a second transmission pattern. Furthermore, first antenna 1221 of radio unit 122 in cell 2200 may transmit a signal with a first transmission pattern and second antenna 1222 of radio unit 112 may transmit a signal with a second transmission pattern.

In accordance with at least one embodiment of the present invention, when user equipment is not located in overlapping service area 13, radio unit 116 may transmit data signal to user equipment 410 and radio unit 122 may transmit data signal to user equipment 420, which is similar to a typical method. When user equipment is located in overlapping service area 13 and/or when at least one of radio units 116 and 122 has high traffic load, both of radio units 116 and 122 may transmit the same data signal to user equipment 410 and 420 each using only one antenna and the same channel. For example, radio units 116 and 122 may transmit the same data signal to user equipment 410 each using one antenna and using a channel A. Furthermore, radio units 116 and 122 may transmit the same data signal to user equipment 420 each using one antenna and using a channel B in accordance with at least one embodiment of the present invention. That is, radio unit 116 may select one antenna that transmits a signal with a first transmission pattern and transmit the data signal to user equipment 410 using the selected antenna. In this case, radio unit 122 may select one antenna that transmits a signal with a second transmission pattern which is different from the first transmission antenna of the selected antenna of radio unit 116 and transmit the same data signal to user equipment 410 through the selected antenna with the second transmission pattern. Particularly, radio unit 116 may transmit data to user equipment 410 using first antenna 1161 that transmit signals with a first transmission pattern and radio unit 122 may transmit the same data to user equipment 410 using second antenna 1222 that transmit signals with a second transmission pattern. That is, first antenna 1161 of radio unit 116 and second antenna 1222 of radio unit 122 may transmit the same data signal to user equipment 410 using the same channel A but different transmission patterns in accordance with at least one embodiment of the present invention.

Similarly for user equipment 420, radio unit 116 may select second antenna 1162 that transmits a signal with a second transmission pattern and transmit a data signal to user equipment 420 through the selected second antenna 1162 with the second transmission pattern using a channel B. Radio unit 122 may select first antenna 1221 that transmits a signal with a first transmission pattern and transmit the same data signal to user equipment 420 through the selected first antenna 1221 using the channel B in accordance with at least one embodiment of the present invention. That is, second antenna 1162 of radio unit 116 and first antenna 1221 of radio unit 122 may transmit the same data with the different transmission patterns to user equipment 420 using the same channel.

When user equipment 410 and 420 receives the same data signal from two radio units 116 and 122, user equipment 410 and 420 may recognize the received signals as multipath signal. Upon the recognition, user equipment 410 and 420 may combine two received signals and restore the original signals in accordance with at least one embodiment of the present invention. Furthermore, upon the recognition, user equipment 410 and 420 may select one having better signal quality among the antennas of radio units 116 and 122 to receive the signal. For example, user equipment 410 and 420 may report signal quality to a coupled digital unit and the coupled digital unit may be select one of the antennas based on the reported signal quality. Particularly, the signal quality of the antennas may be determined based on pre-coding index reported by each user equipment.

As described, two radio units 116 and 122 may transmit the same data signal to user equipment 410 and 420 located in the overlapping service area of radio units 116 and 122 each using one antenna with a different transmission pattern and using the same channel in accordance with at least one embodiment of the present invention. Such method may maximize diversity effect for user equipment 410 and 420 in the overlapping area, improve signal quality, and reduce transmission power of radio units 116 and 122 to transmit data to user equipment 410 and 420 in the boundary area 13.

Figure 7:
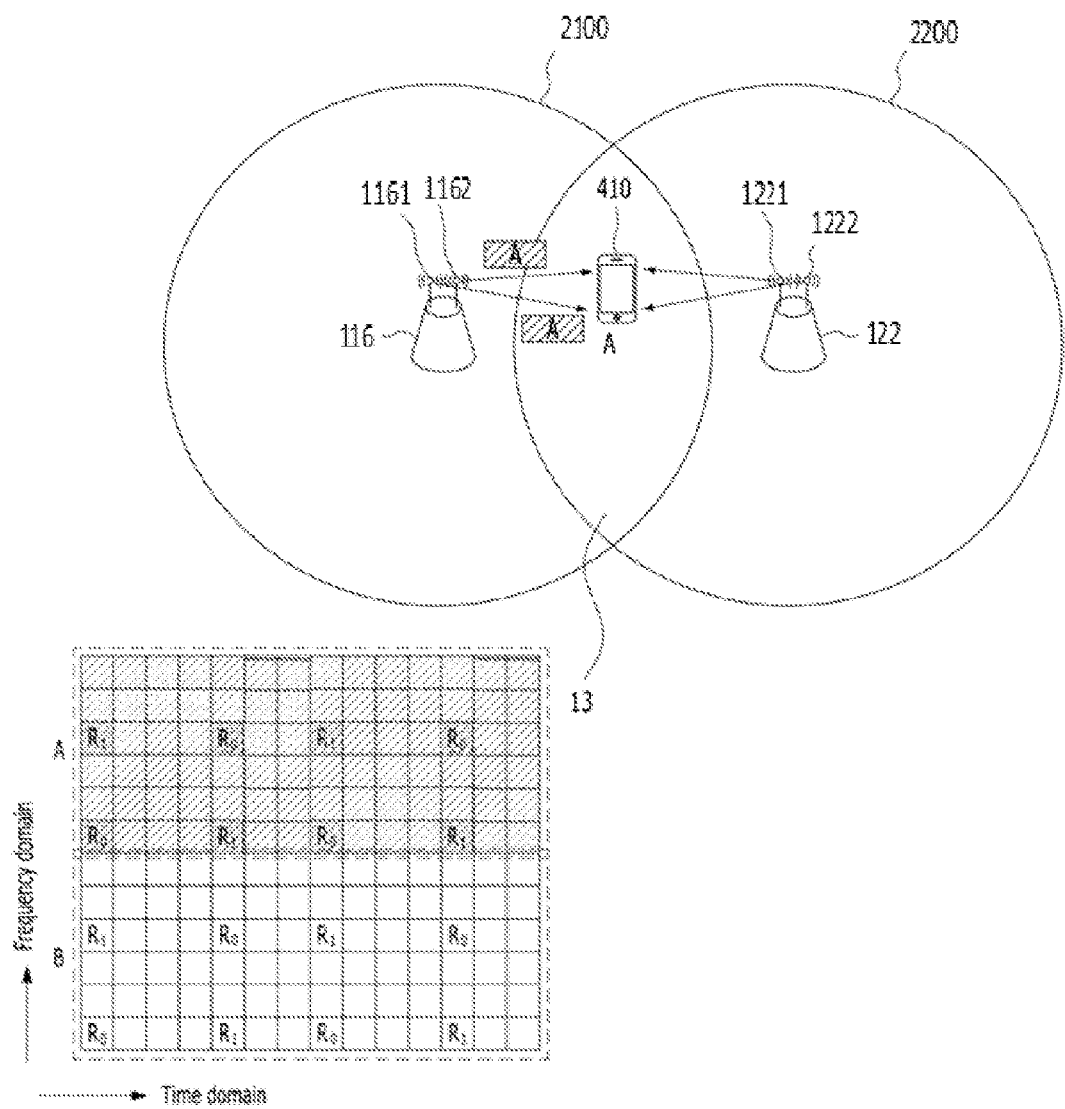
FIG. 7 shows a method of a radio unit having two antennas for transmitting signals to user equipment in an overlapping service area when traffic load of the radio unit is not comparatively high in accordance with at least one embodiment of the present invention.

FIG. 7 shows a method of a radio unit having two antennas for transmitting signals to user equipment in overlapping service area when traffic load of the radio unit is not comparatively high in accordance with at least one embodiment of the present invention.

Referring to FIG. 7, when user equipment 410 is located in overlapping area 13 but traffic load of radio units 116 and 122 is not greater than a predetermined threshold, radio units 166 in cell 2100 and radio unit 122 in cell 2200 may transmit the same signal to user equipment 410 each using two antennas in accordance with at least one embodiment of the present invention. Accordingly, diversity effect may be maximized. Such traffic information may be obtained from a base station or a digital unit managing corresponding radio units.

As described, when user equipment is located in an overlapping area and/or when at least one of radio units has comparatively high traffic load, a digital unit may control two radio units to transmit the same data signal to user equipment in an overlapping service area, each using one of antennas with a different transmission pattern and using the same channel in accordance with at least one embodiment of the present invention. Such an operation of a digital unit will be described with reference to FIG. 7.

Figure 8:
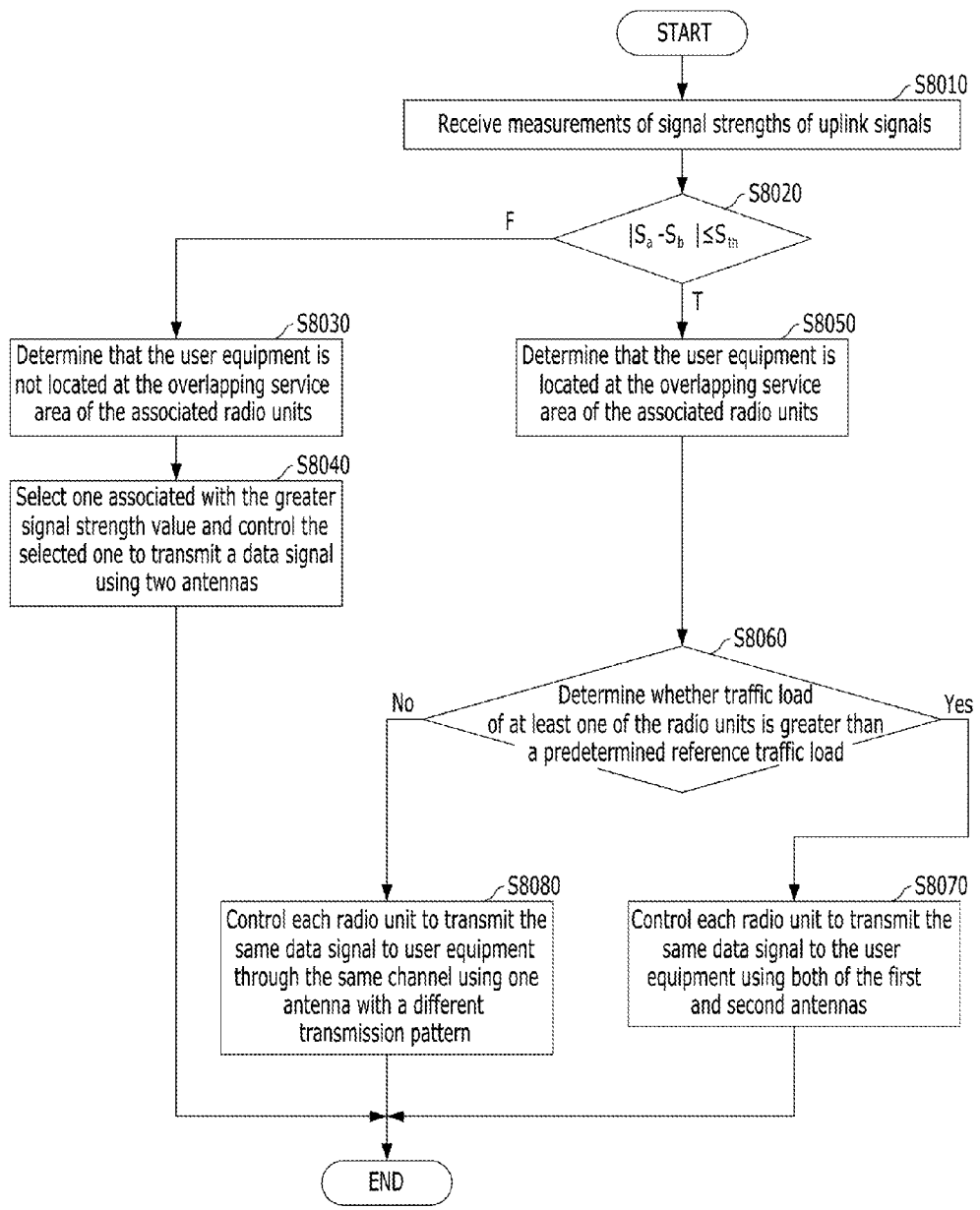
FIG. 8 shows a method of a digital unit for controlling radio units to transmit signals to user equipment located in an overlapping service area in accordance with at least one embodiment of the present invention.

FIG. 8 shows a method of a digital unit for controlling radio units to transmit signals to user equipment located in an overlapping service area in accordance with at least one embodiment of the present invention.

Referring to FIG. 8, at step S8010, a digital unit may receive signal strengths of uplink signals from user equipment to radio units coupled to the digital unit. For example, radio units 116 and 122 may measure signal strengths of signals transmitted from user equipment in a corresponding service area and transmit the measured signal strengths to digital unit 20. Particularly, radio units 116 and 122 measures signal strength of an uplink signal transmitted from user equipment 410. Radio units 116 and 122 may transmit the measured signal strengths to digital unit 20. That is, radio unit 116 may transmit a signal strength value $S_a$ and radio unit 122 may transmit a signal strength value $S_b$ to digital unit 20. Here, the signal strength value $S_a$ may denote the measurement of signal strength of an uplink signal transmitted from user equipment 410 to radio unit 116. The signal strength value $S_b$ may denote measurement of signal strength of an uplink signal transmitted from user equipment 420 to radio unit 122.

At step S8020, the digital unit may compare the received signal strengths associated with the same user equipment with a predetermined threshold. For example, digital unit 20 may receive the signal strength values $S_a$ and $S_b$ associated with user equipment 410, respectively from radio units 116 and 122. Digital unit 20 may determine whether user equipment 410 is located in an overlapping service area of radio units 116 and 122 based on the signal strength values $S_a$ and $S_b$ with the predetermined threshold $S_{th}$ in accordance with at least one embodiment of the present invention. The predetermined threshold $S_{th}$ may be decided based on various factors, such as a capacity of a wireless communication system. For example, digital unit 20 may use Eq. 1 below.

$$|S_a - S_b| \leq S_{th} \quad \text{Eq. 1}$$

The predetermined threshold $S_{th}$ may be decided based on various factors, such as a capacity of a wireless communication system.

At step S8030, the digital unit may determine that the user equipment is not located at the overlapping service area of the associated radio units when the difference between the two received signal strengths 5, and $S_b$ is greater than the predetermined threshold $S_{th}$ (F—S8020).

For example, when one of radio units 116 and 122 is much closer to user equipment 410, the difference between the two received signal strengths $S_a$ and $S_b$ is greater than the predetermined threshold $S_{th}$. Accordingly, user equipment 410 is not located in the overlapping service area of radio units 116 and 122.

At step S8040, the digital unit may select one associated with the greater signal strength value among the radio units transmitting the measured signal strengths and control the selected one to transmit a data signal using two antennas. For example, when the signal strength value $S_a$ is greater than the signal strength value $S_b$, digital unit 20 may select radio unit 116 that measured and transmitted the signal strength value $S_a$ and control radio unit 116 to transmit a data signal to user equipment 410. When the signal strength $S_b$ is greater than the signal strength $S_a$, digital unit 20 may select radio unit 122 that measured and transmitted the signal strength value $S_a$ and control radio unit 122 to transmit a data signal to user equipment 410.

At step S8050, the digital unit may determine that the user equipment is located at the overlapping service area of the associated radio units when the difference between the two received signal strengths $S_a$ and $S_b$ is not greater than the predetermined threshold $S_{th}$ (T—S8020). For example, when user equipment 410 is located in the overlapping service area of radio units 116 and 122, the difference between the two received signal strengths $S_a$ and $S_b$ is not greater than the predetermined threshold $S_{th}$. That is, user equipment 410 may be separated at about the same distance from radio units 116 and 122.

For a first embodiment, step S8060 is not employed, and the method advances from step S8050 to step S8080. For this first embodiment, at step S8080, the digital unit may control the associated radio units to transmit the same data signal to user equipment 410 each using one antenna and using the same channel. For example, when digital unit 20 determines that user equipment 410 is located at the overlapping service areas of radio units 116 and 122, digital unit 20 may control both of radio units 116 and 122 to transmit the same data signal to user equipment 410 using the same channel A but the different transmission pattern in accordance with at least one embodiment of the present invention. Particularly, digital unit 20 may control radio unit 116 to select one of antennas using a channel A and to transmit data using the selected antenna to user equipment 410. Furthermore, digital unit 20 may control radio unit 122 to select one with a transmission pattern different from the selected antenna of radio unit 116 and to transmit the same data to user equipment 410 using the selected antenna.

That is, digital unit 20 controls radio unit 116 to select a first antenna and transmit data to user equipment 410 using the selected first antenna. In this case, digital unit 20 controls radio unit 122 to select a second antenna associated with a transmission pattern different from that of the first antenna of radio unit 116. Then, digital unit 20 controls radio unit 122 to transmit the same data to user equipment 410 using the second antenna. As described, the first antenna of radio unit 116 may use a transmission pattern different from that of the second antenna of radio unit 122. Alternatively, digital unit 20 controls radio unit 116 to select a second antenna to transmit data to user equipment 410. In this case, digital unit 20 controls radio unit 122 to select a first antenna to transmit the data to user equipment 410.

As described, when user equipment is located at an overlapping service area of two adjacent radio units, a coupled digital unit may control each radio unit to transmit the same data signal using one antenna with a different transmission pattern and using the same channel in accordance with at least one embodiment of the present invention. Accordingly, a signal quality may be improved with less power consumption in accordance with at least one embodiment of the present invention.

In accordance a second embodiment of the present invention, traffic load of each radio unit may be considered to provide a related service to user equipment in an overlapping service area, such as shown in step S8060. That is, when the related radio units have comparatively high traffic load, a digital unit may control each radio unit to transmit the same data signal to user equipment using one antenna with a different transmission pattern and using the same channel.

In order to consider the traffic load, the digital unit may determine whether traffic load of the radio units is greater than a predetermined reference traffic load at step S8060. For example, digital unit 20 may determine whether traffic load of radio units 116 and 122 is higher than a predetermined reference traffic level. Such traffic information may be obtained from a base station or a digital unit managing corresponding radio units, but the present invention is not limited thereto. The traffic load of each radio unit may be determined through various well-known methods.

At step S8070 (Yes—S8060), the digital unit may control each radio unit to transmit the same data signal to the user equipment using both of the first and second antennas when the traffic load of the associated radio units is lower than the predetermined reference traffic level. For example, when the traffic load levels of radio units 116 and 122 are lower than the predetermined reference traffic level, digital unit 20 may control radio units 116 and 122 to transmit the same data signal to the user equipment using both of the first and second antennas.

At step S8080 (No—S8060), the digital unit may control each radio unit to transmit the same data signal to user equipment 410 through the same channel using one antenna with a different transmission pattern when the traffic load levels of the radio units are higher than the predetermined reference traffic level. For example, when digital unit 20 determines that user equipment 410 is located at the overlapping service areas of radio units 116 and 122 and when digital unit 20 determines that the traffic load levels of radio units 116 and 122 are higher than the predetermined reference traffic load level, digital unit 20 may control both of radio units 116 and 122 to transmit the same data signal to user equipment 410 using the same channel A but the different transmission pattern in accordance with at least one embodiment of the present invention. That is, digital unit 20 controls radio unit 116 to select a first antenna and transmit data to user equipment 410 using the selected first antenna. In this case, digital unit 20 controls radio unit 122 to select a second antenna associated with a transmission pattern different from that of the first antenna of radio unit 116. Then, digital unit 20 controls radio unit 122 to transmit the same data to user equipment 410 using the second antenna. As described, the first antenna of radio unit 116 may use a transmission pattern different from that of the second antenna of radio unit 122. Alternatively, digital unit 20 controls radio unit 116 to select a second antenna to transmit data to user equipment 410. In this case, digital unit 20 controls radio unit 122 to select a first antenna to transmit the data to user equipment 410.

As described, when user equipment is located at an overlapping service area of two adjacent radio units and/or when the radio units have the higher traffic load, a coupled digital unit may control each radio unit to transmit the same data signal using one antenna with a different transmission pattern and the same channel in accordance with at least one embodiment of the present invention.

When multiple user equipment is located at the same overlapping service area, the same operation may be performed but the radio units may use a different channel to transmit a data signal to each one of user equipment. For example, when user equipment 420 is also located in the overlapping service area of radio units 116 and 122, digital unit 20 may control radio units 116 and 122 to use a channel B for transmitting the same data signal using one antenna with a different transmission pattern. The channel B is different from the channel A which is used for transmitting a data signal to user equipment 410.

Hereinafter, a digital unit for controlling radio units to transmit signals using one antenna and the same channel to user equipment in an overlapping area in accordance with at least one embodiment of the present invention will be described with reference to FIG. 9. For convenience and ease of understanding, a digital unit will be described as performing the control operation with reference to FIG. 9. The present invention, however, is not limited thereto. An independent device, separated from the digital unit, may perform the same control operation in accordance with another embodiment of the present invention. Such independent device may be coupled to the digital unit through a wired link or a wireless link.

Figure 9:
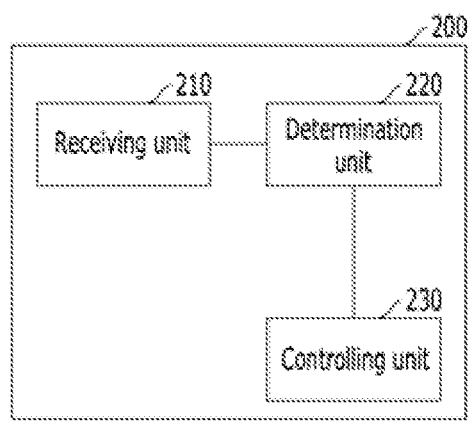
FIG. 9 shows a digital unit in accordance with at least one embodiment of the present invention.

FIG. 9 shows a digital unit in accordance with at least one embodiment of the present invention.

Referring to FIG. 9, digital unit 20 may include receiving unit 210, determination unit 220, and controlling unit 230 in accordance with at least one embodiment of the present invention.

Receiving unit 210 may receive a radio signal from radio units 116 and 122. The radio signal may include signal strength values of uplink signals between radio units 116 and 122 and user equipment 410 and 420. Furthermore, receiving unit 210 may collect information on traffic loads of radio units 116 and 122.

Determination unit 220 may determine whether user equipment 410 and 420 are located in overlapping service area 300 of radio units 116 and 122. In order to determine, determination unit 220 may consider the received signal strength values from radio units 116 and 122. Particularly, Eq. 1 may be used to determine whether user equipment 410 and 420 are located in overlapping service area. Furthermore, determination unit 220 may determine whether radio units 116 and 122 have high traffic loads or not based on the collected information.

Controlling unit 230 may control radio units 116 and 122 for transmitting a data signal based on the determination result of determination unit 220. For example, when determination unit 220 determines that user equipment 410 and 420 are located at the overlapping service area of radio units 116 and 122 and when determination unit 220 determines that at least one of radio units 116 and 122 has high traffic load, controlling unit 230 may control radio units 116 and 122 to transmit the same data signal to user equipment 410 and 420 using one antenna with a different transmission pattern through the same channel. That is, controlling unit 230 may allocate the same resource to radio units 116 and 122 and control radio units 111 and 121 to transmit the same data each using one antenna with the different transmission pattern and the same channel in accordance with at least one embodiment of the present invention.

As described, a digital unit may control each radio unit to transmit the same data to user equipment using one antenna with a different transmission pattern through the same channel when user equipment is located at the overlapping service area and/or when traffic load of at least one of radio units is higher than a reference traffic load in accordance with at least one embodiment of the present invention. Accordingly, diversity effect of user equipment may be maximized at a boundary area of radio units, thereby improving signal quality at the boundary area of radio units. Furthermore, power of radio units may be efficiently controlled in accordance with at least one embodiment of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations.

That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling radio units to transmit a signal to user equipment wherein each one of the radio units includes at least two antennas including a first antenna and a second antenna, each associated with a different transmission pattern, the method comprising:
   determining whether user equipment is located at an overlapping service area of a first radio unit and a second radio unit;
   determining whether traffic load of at least one of the first and second radio units is greater than a predetermined reference traffic load; and
   controlling the first radio unit to transmit a signal to the user equipment using the first antenna and controlling the second radio unit to transmit the same signal to the user equipment using the second antenna when the user equipment is located in the overlapping service area and when the traffic load of at least one of the first and second radio units is greater than the predetermined reference traffic load,
   wherein a transmission pattern of the first antenna of the first radio unit is different from a transmission pattern of the second antenna of the second radio unit.

2. The method of claim 1, wherein the determining includes:
   receiving a signal strength value $S_a$ of an uplink signal between the user equipment and the first radio unit;
   receiving a signal strength value $S_b$ of an uplink signal between the user equipment and the second radio unit;
   comparing a difference of the signal strength values $S_a$ and $S_b$ with a predetermined threshold $S_{th}$; and
   determining whether the user equipment is located in the overlapping service area of the first radio unit and the second radio unit based on the comparison result.

3. The method of claim 2, wherein the determining includes:
   determining that the user equipment is located in the overlapping service area when the difference is smaller than the predetermined threshold $S_{th}$; and
   determining that the user equipment is not located in the overlapping service area when the difference is greater than the predetermined threshold $S_{th}$.

4. The method of claim 2, wherein the controlling including:
   selecting one of the first and second radio units based on the signal strength values $S_a$ and $S_b$ when the user equipment is determined as being not located in the overlapping service area; and
   controlling the selected one to transmit the signal to the user equipment using both of the first and second antennas.

5. The method of claim 1, further comprising: controlling the first radio unit and the second radio unit to transmit the same signal to the user equipment each using both of the first and second antennas when the first and second radio units are determined as having comparatively low traffic load.

6. The method of claim 1, wherein the transmission pattern associated with each antenna is a reference signal pattern to transmit a reference signal to the user equipment.

7. The method of claim 1, wherein in the controlling, the first and second radio units transmit the same signal to the user equipment using a same channel when the user equipment is located in the overlapping service area.

8. The method of claim 1, wherein the first and second radio units are spatially separated from a digital unit, coupled to a digital unit through a communication link, and transmit the signals to the user equipment in response to instructions of the digital unit.

9. The method of claim 1, wherein the first and second radio units transmit signals using resources based on one of orthogonal frequency division multiplexing (OFDM) and wideband code division multiple access (WCDMA).

10. The method of claim 1, wherein the first radio unit is included in a cell and the second radio unit is included in another cell adjacent to the cell of the first radio unit.

11. A digital unit for controlling a plurality of radio units to transmit a signal to user equipment, where each of the plurality of radio units includes at least two antennas including a first antenna and a second antenna each associated with a different transmission pattern, the digital unit comprising:
 a receiving unit configured to receive a signal strength value $S_a$ of uplink signals between user equipment and a first radio unit, to receive a signal strength value $S_b$ of uplink signals between the user equipment and a second radio unit, and to receive information on traffic load of the first radio unit and the second radio unit;
 a determination unit configured to determine whether the user equipment is located at an overlapping service area of the first radio unit and the second radio unit based on the received signal strength values $S_a$ and $S_b$ of uplink signals and to determine whether at least one of the first and second radio units has comparatively high traffic load based on the received information on the traffic load; and
 a controlling unit configured to control the first radio unit and the second radio unit to transmit the same signal to the user equipment each using both of the first and second antennas when the user equipment is determined as being located in the overlapping service area and when the first and second radio units are determined as having comparatively low traffic load,
 wherein a transmission pattern of the first antenna of the first radio unit is different from a transmission pattern of the second antenna of the second radio unit.

12. The digital unit of claim 11, wherein the determination unit is configured to:
 compare a difference of the signal strength values $S_a$ and $S_b$ with a predetermined threshold $S_{th}$;
 determine that the user equipment is located in the overlapping service area when the difference is smaller than the predetermined threshold $S_{th}$; and
 determine that the user equipment is not located in the overlapping service area when the difference is greater than the predetermined threshold $S_{th}$.

13. The digital unit of claim 11, wherein the controlling unit is configured to:
 select one of the first and second radio units based on the signal strength values $S_a$ and $S_b$ when the user equipment is determined as being not located in the overlapping service area; and
 control the selected one to transmit the signal to the user equipment using both of the first and second antennas.

14. The digital unit of claim 11, wherein the controlling unit is configured to:
 control the first radio unit and the second radio unit to transmit the same signal to user equipment using the same channel when the user equipment is located in the overlapping service area and/or when at least one of the first and second radio units has comparatively high traffic load.

15. The digital unit of claim 11, wherein:
 the digital unit is configured to be spatially separated from the first and second radio units and coupled to the first and second radio units through a communication link;
 the first radio unit is included in a cell and the second radio unit is included in another cell adjacent to the cell of the first radio unit; and
 the transmission pattern is a reference signal pattern for transmitting a reference signal based on one of orthogonal frequency division multiplexing (OFDM) and wideband code division multiple access (WCDMA).

16. A radio unit spatially separated from a digital unit and transmitting and receiving a signal to/from user equipment in response to the digital unit, the radio unit configured to:
 include a first antenna and a second antenna each associated with a different transmission pattern;
 in response to an instruction of the digital unit, select one of the first antenna and the second antenna and transmit a signal to user equipment using the selected one antenna when the user equipment is located at an overlapping service area of the radio unit and a neighbor radio unit and when the radio unit has a comparatively high traffic load,
 wherein when the radio unit transmits the signal to the user equipment using the selected one antenna, the neighbor radio unit transmits the same signal to the user equipment using one antenna associated with a transmission pattern different from the selected one antenna of the radio unit, and
 wherein the radio unit is configured to transmit a signal to the user equipment using both of the first antenna and the second antenna when the user equipment is in the overlapping service area and when the traffic load of the radio unit is comparatively low.

17. The radio unit of claim 16, wherein:
 the radio unit is configured to transmit the signal to the user equipment using the same channel that the neighbor radio unit uses to transmit the same signal to the user equipment when the user equipment is located in the overlapping service area and/or when at least one of the first and second radio units has comparatively high traffic load;
 the neighbor radio unit is included in a cell adjacent to a cell of the radio unit; and
 the transmission pattern is a reference signal pattern for transmitting a reference signal based on one of orthogonal frequency division multiplexing (OFDM) and wideband code division multiple access (WCDMA).

* * * * *